Patented Apr. 5, 1932

1,852,856

UNITED STATES PATENT OFFICE

EDWARD J. PRANKE, OF BAYSIDE, NEW YORK

PROCESS OF PRODUCING CYANIDS

No Drawing.    Application filed August 25, 1930.  Serial No. 477,805.

This invention relates to processes for producing cyanids by the use of calcium cyanamid, or calcium carbid and free nitrogen, and has for its object to produce cyanids at lower costs than the processes at present in use, and also to produce improved cyanid products.

In my co-pending application, U. S. Serial No. 472,482 I have shown a large number of chemical reactions by which cyanids can be formed from calcium cyanamid and a suitable source of sodium, with or without a reducing agent, or from calcium carbid, free nitrogen and a suitable source of sodium, with or without carbon. I further describe in the said application methods of carrying out the said reactions at high temperatures, and particularly means for preventing volatile substances, particularly sodium, from permanently leaving the reaction zone, namely by passing the said volatile substances through interstices in the incoming cold charge, thus causing volatilized sodium or sodium compounds to be condensed and carried again into the reaction zone.

I have further discovered, however, other means of dealing with volatile substances, which may, in certain cases, be more easily and efficiently carried out than the means described in the said co-pending application.

I have stated in my said co-pending application, for example, that the new cyanid which I have discovered and which I call sodium calcium cyanid, is preferably formed at a temperature above 1400° C., and is not so efficiently formed at lower temperatures. It is well-known, however, that calcium cyanamid decomposes with loss of free nitrogen on being heated to 1250° C. or higher. In the presence of elementary sodium the products of decomposition of calcium cyanamid are recombined with sodium at 1250° C. and higher, as fast as the calcium cyanamid decomposes. When using, however, as a source of sodium a sodium compound which does not give up elementary sodium at the temperature used as fast as the calcium cyanamid is decomposed, free nitrogen will escape from the reaction zone and necessarily correspondingly reduce the final yield of cyanid. In using calcium carbid and free nitrogen instead of calcium cyanamid a similar difficulty is encountered, if the decomposition of the sodium compound is at a faster rate than nitrogen can be introduced. The yield is, of course, reduced in proportion to the sodium loss unless the sodium is condensed and returned to the reaction zone.

I have discovered that such losses of free nitrogen or sodium can be prevented by substantially the same means, that is to say, by introducing the compound which is decomposed at a relatively too rapid rate in relatively small quantities into a fused bath of nearly finished cyanid product containing proportional or slightly larger than proportional quantities of the remaining materials required to form the cyanid.

For example, if I wish to carry out the reaction:

$$2CaCN_2 + 4C + Na_2CO_3 \rightarrow$$
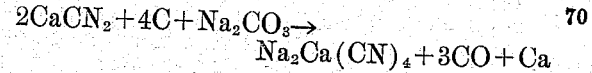
$$Na_2Ca(CN)_4 + 3CO + Ca$$

I find that this cannot be successfully done by mixing a charge in the proportions indicated by the above equation and simply heating to a high temperature in an ordinary crucible, for the reason that the calcium cyanamid is decomposed with loss of nitrogen at about 1250° C., while sodium is not made available as elementary sodium until about 1350° C. is reached. If, however, I first prepare a fused mass, at a temperature of about 1400° C., preferably of composition similar to the product I desire to make, and to this highly heated fused mass suddenly add small portions of the mixture, beneath the surface of the fused mass, the relatively small quantity of mixture added is almost instantly raised to the temperature of the fused mass and is decomposed and the decomposition products from which the cyanid is to be formed are recombined as cyanid before any of them can escape from the reaction zone.

Similarly, if I desire, for example, to carry out the reaction:

$$CaC_2 + N_2 + 2NaCN \rightarrow Na_2Ca(CN)_4$$

I find that this cannot be done successfully by merely mixing the calcium carbid and sodium cyanid, heating to above 1400° C. and passing nitrogen into the fused mass, for the reason that the sodium cyanid is decomposed by the carbid at a temperature of about 1300° C., and loses sodium at a greater rate than the nitrogen can be brought in. If, however, I first prepare a fused bath, at a temperature of say above 1400° C., preferably of composition similar to that of the product I desire to make, and to this highly heated fused mass add small portions of the mixture described, beneath the surface of the fused mass, and add the nitrogen at a rate slightly larger than chemically proportional, the solid materials added are almost instantly raised to the temperature of the fused mass, become decomposed, and the resulting products intermingle with and combine with the nitrogen before any of them, except the excess of nitrogen, can escape from the reaction zone.

Obviously, it does not make any essential difference whether the relatively small portions of charge are added from the top, sides or bottom of the fused mass, but it is desirable that they be introduced bodily into the fused mass and not merely on the surface. The essential point is that the change from below the temperature of decomposition of the most easily decomposed ingredient to the temperature of most efficient cyanid formation shall be so sudden that no one or more of the decomposition products needed to form the cyanid will escape before the other products needed are formed and in a position to recombine as cyanid. Any means of bringing this about will serve the same purpose.

As an example of one way in which my invention may be carried out in practice, I may provide a simple electric crucible furnace consisting of a graphite crucible of cylindrical shape, the bottom of which is connected to one terminal of a source of electric energy, the other terminal being connected to an electrode suspended from above the furnace, the electrode being capable of being lowered into the crucible to any desired depth and to lead in electric current to heat the charge by the passage of the current therethrough. Level with the hearth of the crucible I provide a horizontal, water-cooled channel leading from outside of the furnace to the inside of the crucible. Through this channel by means of a revolving screw fed from a suitable hopper outside of the furnace I introduce a suitable charge mixture into the inside of the crucible in which I have previously provided by any suitable means a fused cyanid mass heated to about 1400° C. The cold charge is fed by the revolving screw into the fused cyanid mass at a rate proportional to the development of heat generated by the passage of the electric current through the fused mass, so that the charge introduced, and its decomposition products, will become heated to substantially 1400° C. before the gaseous products will have reached and broken through the surface of the fused mass. According to my discoveries, gaseous sodium and nitrogen at a temperature of about 1400° C. contacted with calcium carbid or free calcium and carbon will avidly combine to form calcium sodium cyanid, stable at this temperature. The calcium sodium cyanid, mixed with the fused mass in the furnace may be removed from the furnace through a tap-hole at the bottom of the furnace or at a level higher up in the crucible, either continuously or intermittently, always leaving in the crucible, however, a sufficient amount of fused mass to enable the above operations to be carried out in an efficient manner.

Obviously, the method herein described can, if desired, be applied to any of the reactions shown in my aforesaid co-pending application, and to similar reactions.

What I claim is:

1. The process of producing cyanid which consists in providing a fused cyanid mass at about 1400° C., feeding beneath the surface thereof calcium cyanamid and a suitable source of sodium at such a rate that volatile elements formed between a red heat and 1400° C. will be heated to about 1400° C. and become contacted with non-volatile materials in the said fused mass, thereby reacting to form cyanid, removing such cyanid mixed with the said fused mass, and rapidly cooling.

2. The process of producing cyanid which consists in providing a fused cyanid mass at about 1400° C., feeding beneath the surface thereof calcium cyanamid and sodium at such a rate that the elementary nitrogen and gaseous sodium formed between a red heat and 1400° C. will be heated to about 1400° C. and become contacted with the residual non-volatile materials in the said fused mass, thereby reacting to form cyanid, removing such cyanid mixed with the said fused mass, and rapidly cooling.

3. The process of producing cyanid which consists in providing a fused cyanid mass at about 1400° C., feeding beneath the surface thereof calcium cyanamid and sodium cyanid at such a rate that the elementary nitrogen and sodium formed between a red heat and 1400° C. will be heated to about 1400° C. and become contacted with the residual non-volatile materials in the said fused mass, thereby reacting to form cyanid, removing such cyanid mixed with the said fused mass, and rapidly cooling.

4. The process of producing cyanid which consists in providing a fused cyanid mass at about 1400° C., feeding beneath the surface thereof crude calcium cyanamid and sodium chlorid at such a rate that the elementary nitrogen and sodium formed between a red heat and 1400° C. will be heated to about 1400° C. and become contacted with the residual non-volatile materials in the said fused mass, thereby reacting to form cyanid, removing such cyanid mixed with the said fused mass, and rapidly cooling.

5. The process of producing cyanid which consists in providing a fused cyanid mass at about 1400° C., feeding beneath the surface thereof crude calcium cyanamid, sodium carbonate and a carbonaceous reducing agent at such a rate that the elementary nitrogen and sodium formed between a red heat and 1400° C. will be heated to about 1400° C. and become contacted with the residual non-volatile materials in the said fused mass, thereby reacting to form cyanid, removing such cyanid, mixed with the said fused mass, and rapidly cooling.

6. The process of producing cyanid which consists in providing a fused cyanid mass at about 1400° C., feeding beneath the surface thereof calcium carbid, sodium and nitrogen at such a rate that the gaseous sodium and nitrogen will be heated to about 1400° C. and become contacted with the calcium carbid in the said fused mass at 1400° C., thereby forming cyanid, removing such cyanid, mixed with the said fused mass, and rapidly cooling.

7. The process of producing cyanid which consists in providing a fused cyanid mass at about 1400° C., feeding beneath the surface thereof calcium carbid, sodium cyanid and nitrogen at such a rate that the gases formed therefrom between a red heat and 1400° C. and the nitrogen fed as such will be heated to about 1400° C. and become contacted with the residual products of the said materials, thereby forming cyanid, removing such cyanid, mixed with the said fused mass, and rapidly cooling.

8. The process of producing cyanid which consists in providing a fused cyanid mass at about 1400° C., feeding beneath the surface thereof calcium carbid, sodium chlorid and nitrogen at such a rate that the gases formed therefrom between a red heat and 1400° C. will be heated to about 1400° C. and become contacted with the residual products of the said materials, thereby forming cyanid, removing such cyanid mixed with the said fused mass, and rapidly cooling.

9. The process of producing cyanid which consists in providing a fused cyanid mass at about 1400° C., feeding beneath the surface thereof calcium carbid, sodium carbonate and nitrogen at such a rate that the sodium released between a red heat and 1400° C., and the nitrogen will be heated to about 1400° C. and become contacted with the residual products of the said materials in the said fused mass, thereby forming cyanid, removing such cyanid mixed with the said fused mass, and rapidly cooling.

10. The process of producing cyanid which consists in providing a fused cyanid mass at about 1400° C., feeding beneath the surface thereof calcium carbid, sodium carbonate, carbon and nitrogen at such a rate that the sodium released between a red heat and 1400° C. and the nitrogen will be heated to about 1400° C. and become contacted with the residual products of the said materials in the said fused mass, thereby forming cyanid, removing such cyanid mixed with the said fused mass, and rapidly cooling.

11. The process of producing cyanid which consists in providing a fused cyanid mass at 1400° C. containing calcium carbid or free calcium and carbon, feeding beneath the surface thereof a suitable source of sodium, and nitrogen, at such a rate that the sodium formed between the red heat and 1400° C. and the nitrogen will be heated to about 1400° C. and become contacted with the said calcium carbid or calcium and carbon in the said fused mass, thereby forming cyanid, removing such cyanid mixed with the said fused mass, and rapidly cooling.

12. In a process of producing crude calcium sodium cyanid in a fused mass from suitable materials at about 1400° C. the method of preventing loss of volatile elements while heating the materials from a red heat to the said 1400° C. which consists in introducing the materials producing such volatile elements beneath the surface of the said mass at such a rate that the volatile elements will be heated to about 1400° C. in the said fused mass, thereby forming a fused cyanid by combining with non-volatile materials in the said fused mass.

In testimony whereof, I affix my signature.

EDWARD J. PRANKE.